(12) United States Patent
Lin (10) Patent No.: US 6,623,195 B2
(45) Date of Patent: Sep. 23, 2003

(54) COLLAPSIBLE KEYBOARD

(75) Inventor: Winky Lin, Taipei (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/964,439

(22) Filed: Sep. 28, 2001

(65) Prior Publication Data

US 2003/0063939 A1 Apr. 3, 2003

(51) Int. Cl.$^7$ .............................. B41J 27/02; B41J 5/28; B41J 5/12; B41J 5/14; B41J 5/16
(52) U.S. Cl. .................. 400/490; 400/472; 400/495; 400/495.1; 400/491.2; 400/680; 400/681; 400/682
(58) Field of Search ................... ; 400/472, 490, 400/491.2, 495, 495.1, 680, 488, 489, 681, 682; B41J 5/12, 5/14, 5/16

(56) References Cited

U.S. PATENT DOCUMENTS

| 5,044,798 A | * | 9/1991 | Roylance et al. | 400/472 |
|---|---|---|---|---|
| 5,463,195 A | * | 10/1995 | Watanabe et al. | 200/5 A |
| 5,590,020 A | * | 12/1996 | Sellers | 361/680 |
| 5,602,715 A | * | 2/1997 | Lempicki et al. | 361/680 |
| 5,635,928 A | * | 6/1997 | Takagi et al. | 341/22 |
| 5,767,464 A | * | 6/1998 | Dyer et al. | 200/5 A |
| 5,799,772 A | * | 9/1998 | Sanda et al. | 200/344 |
| 5,800,085 A | * | 9/1998 | Lee | 400/489 |
| 5,842,798 A | * | 12/1998 | Su | 400/491.2 |
| 6,092,944 A | * | 7/2000 | Butler | 400/492 |
| 6,107,584 A | * | 8/2000 | Yoneyama | 200/344 |
| 6,257,782 B1 | * | 7/2001 | Maruyama et al. | 400/495.1 |
| 6,331,850 B1 | * | 12/2001 | Olodort et al. | 345/168 |
| 6,388,219 B2 | * | 5/2002 | Hsu et al. | 200/517 |
| 2002/0018683 A1 | * | 2/2002 | Roysden, Jr. | 400/472 |

* cited by examiner

*Primary Examiner*—Andrew H. Hirshfeld
*Assistant Examiner*—Andrea Hence Evans
(74) *Attorney, Agent, or Firm*—Rabin & Berdo, P.C.

(57) ABSTRACT

A collapsible keyboard comprises at least one keyboard module, and each keyboard module has a plurality of keyswitches arranged in array pattern. At least one membrane circuit is provided to connect the plurality of keyswitches. When the keyboard is in an operation state, each keyswitch having a predetermined separation with adjacent keyswitch, and the separation is the same as that in a standard keyboard. To shrink the keyboard, the plurality of keyswitches can be arranged in a collapsed state to reduce the transverse size of the keyboard, the lengthwise size of the keyboard, or both sizes.

2 Claims, 8 Drawing Sheets

COLLAPSIBLE KEYBOARD

FIELD OF THE INVENTION

The present invention relates to a collapsible keyboard, especially to a collapsible key board for compact electronic devices such as a PDA (personal digital assistant).

BACKGROUND OF THE INVENTION

The current trend of electronic products is to provide portability for the user. Therefore, the PDA and cellular phones are prevailing, and user interfaces for the portable electronic products, such as keyboards, are also under extensive development.

The design goals of the keyboards for portable electronic products is compact size and preserving good ergonomics and function.

The size of the keyboard can be reduced by decreasing the size of each keyswitch on the keyboard. Alternatively, the separation between adjacent keyswitches can also be reduced for further decreasing the size of the keyboard. However, the keyboard with over crowded arrangement of keyswitches may cause frequent typewriting errors.

The foldable keyboard is another kind of keyboard for providing portability. However, the reduction in size still has limits.

Figure 1:
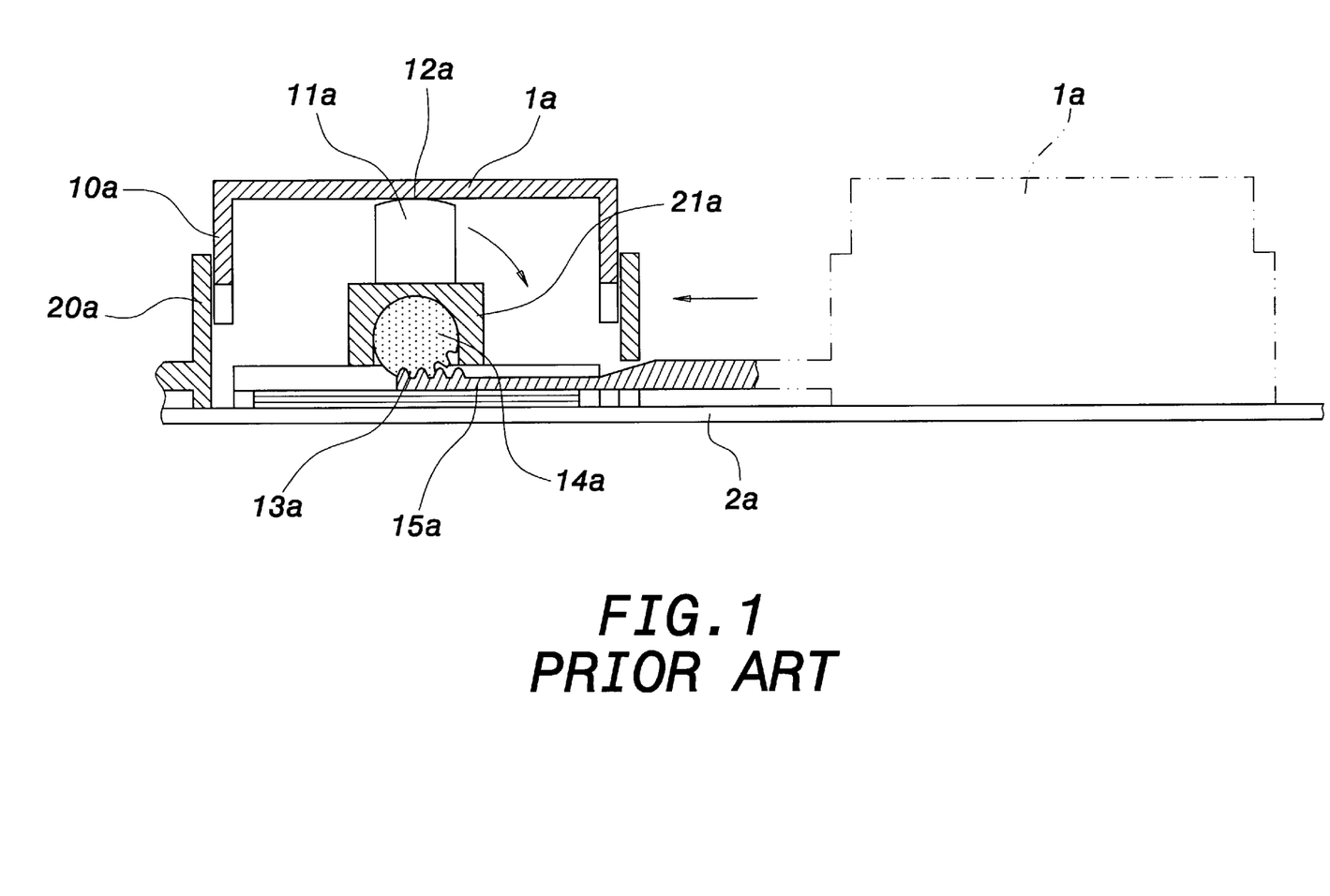
FIG. 1 shows a prior art keyboard with variable volume in an operation state.
Figure 2:
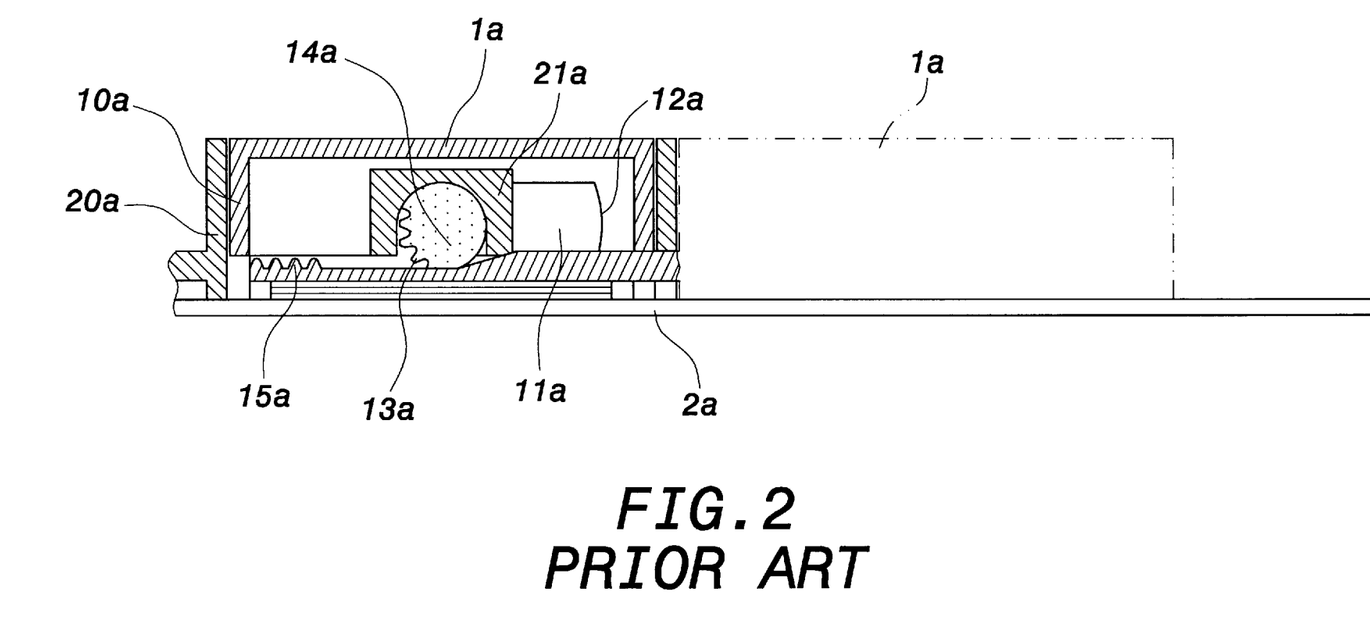
FIG. 2 shows a prior art keyboard with variable volume in a shrunk state.

FIG. 1 shows a prior art keyboard with variable volume. The keyboard has a plurality of keyswitches 1a. A sidewall 10a is arranged on a lateral side of one keyswitch 1a and attached to an inner surface of a supporting wall 20a of a base 2a, whereby the keyswitch 1a can be slid in a vertical direction. The keyswitch 1a further has a restoring spring ha with a bump 12a on a topside thereof. The bump 12a is in contact with a top inner surface of the keyswitch 1a to boost the keyswitch 1a for operation. The keyswitch 1a further has a cylindrical shaft 14a below the spring ha and having serrations 13a on an outer circumference thereof. The cylindrical shaft 14a is pivotally arranged on a retaining case 21 a of the base 2a. Moreover, a driving plate 15a is engaged with the serrations 13a of the cylindrical shaft 14a and connected to another keyswitch 1a. To shrink the keyboard, the driving plate 15a is pushed by an adjacent keyswitch 1a and rotates the cylindrical shaft 14 through the serrations 13a. As shown in FIG. 2, the bump 12a separates from the top inner surface of the keyswitch 1a and then the keyswitch 1a falls by the weight per se.

In the above-mentioned keyboard, the keyswitch 1a falls to reduce the volume of the keyboard. However, the keyswitch 1a should have sufficient height to accommodate the cylindrical shaft 14a and the driving plate 15a. The effect of volume reduction is limited.

Moreover, the keyswitch 1 has a complicated structure and the assembling thereof is cumbersome.

SUMMARY OF THE INVENTION

It is the object of the present invention to provide a collapsible keyboard with keyswitches having standard separation during operation and having reduced separation after operation.

To achieve the above object, the present invention provides a collapsible keyboard having at least one keyboard module. The keyboard module has a plurality of keyswitches arranged in an array pattern. At least one membrane circuit is provided to connect the plurality of keyswitches. When the keyboard is in an operation state, each keyswitch has a predetermined separation with an adjacent keyswitch, and the separation is the same as that in a standard keyboard. To shrink the keyboard, the plurality of keyswitches can be arranged in a collapsed state to reduce the transverse size of the keyboard, the lengthwise size of the keyboard, or both sizes. The various objects and advantages of the present invention will be more readily separation is the same as that in a standard keyboard. To shrink the keyboard, the plurality of keyswitches can be arranged in a collapsed state to reduce the transverse size of the keyboard, the lengthwise size of the keyboard, or both sizes. The various objects and advantages of the present invention will be more readily understood from the following detailed description when read in conjunction with the appended drawings, in which:

DETAILED DESCRIPTION OF THE INVENTION

Figure 3:
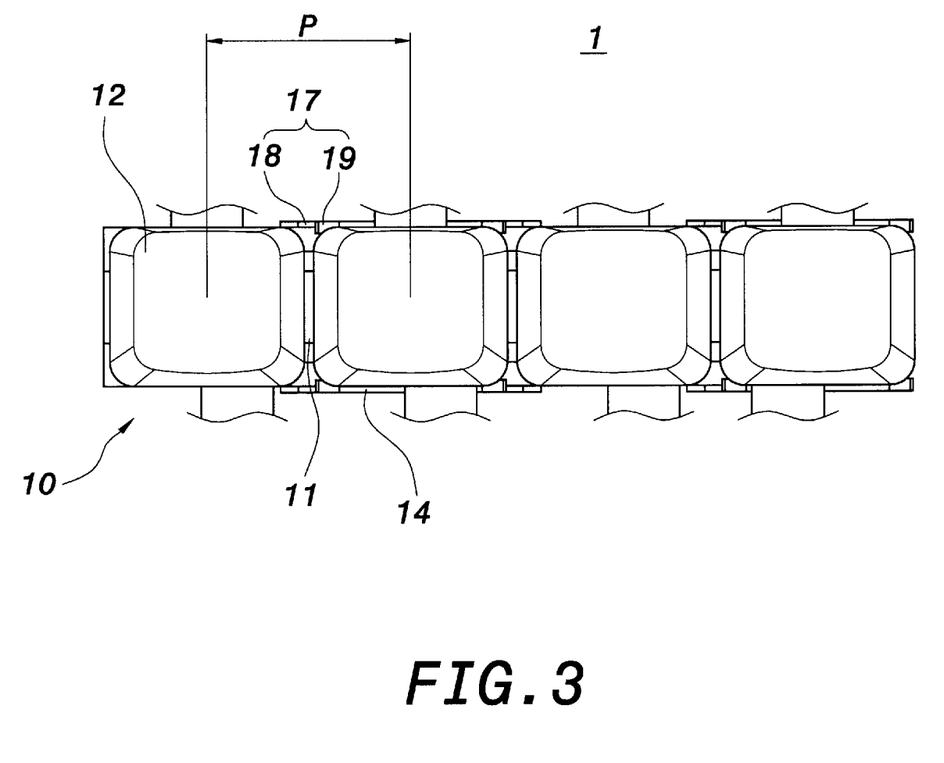
FIG. 3 shows a partial top view of the keyboard according to the present invention.
Figure 4:
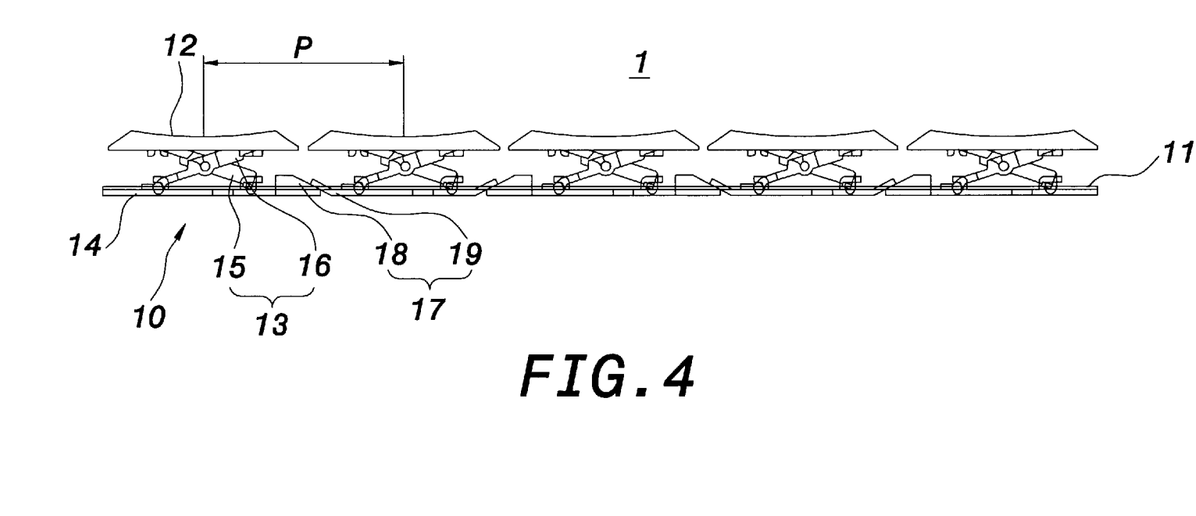
FIG. 4 shows a partial sectional view of the keyboard in an expanded state according to the present invention.

FIG. 3 shows a partial top view of the keyboard according to the present invention, and FIG. 4 shows a partial sectional view of the keyboard according to the present invention. The present invention provides a collapsible keyboard with at least one keyboard module 1. Each keyboard module 1 has a plurality of keyswitches 10 and a membrane circuit 11 connected to the keyswitches 10.

Two adjacent keyswitches 10 have a separation P as shown in FIG. 3. The separation P is similar to that in a standard keyboard (about 19 mm). Each keyswitch 10 comprises a key cap 12, a lever assembly 13 and a base 14.

The lever assembly 13 is of a scissors structure and comprises two pivotally arranged levers 15 and 16. The top ends of levers 15 and 16 link to the bottom of the key cap 12, and the bottom ends thereof link to the top of the base 14. When the key cap 12 is pressed, the levers 15 and 16 sink into the key cap 12 to reduce the height of the keyswitch 10.

Figure 5:
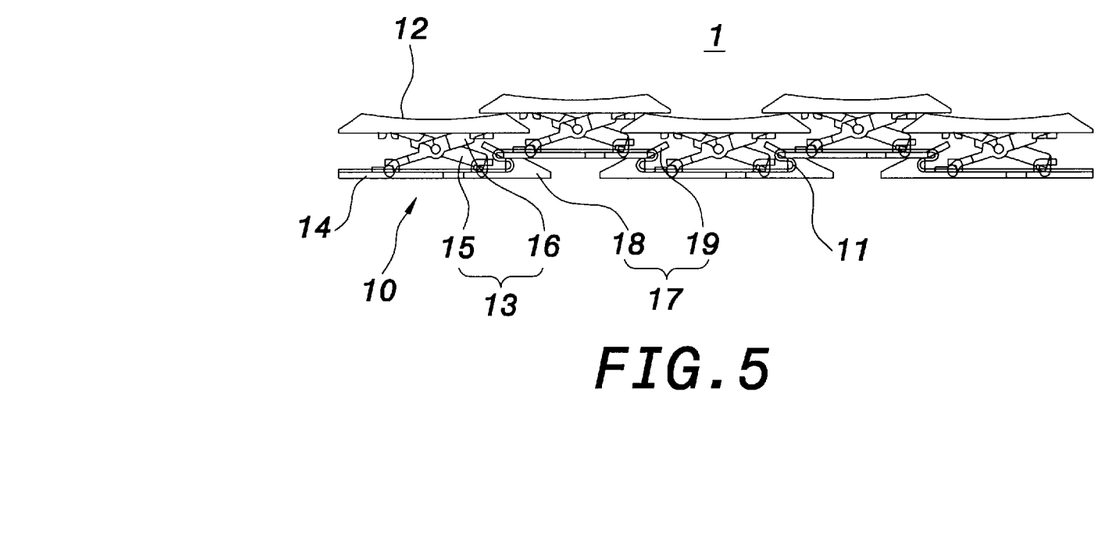
FIG. 5 shows a partial sectional view of the keyboard in a collapsed state according to the present invention.
Figure 10:
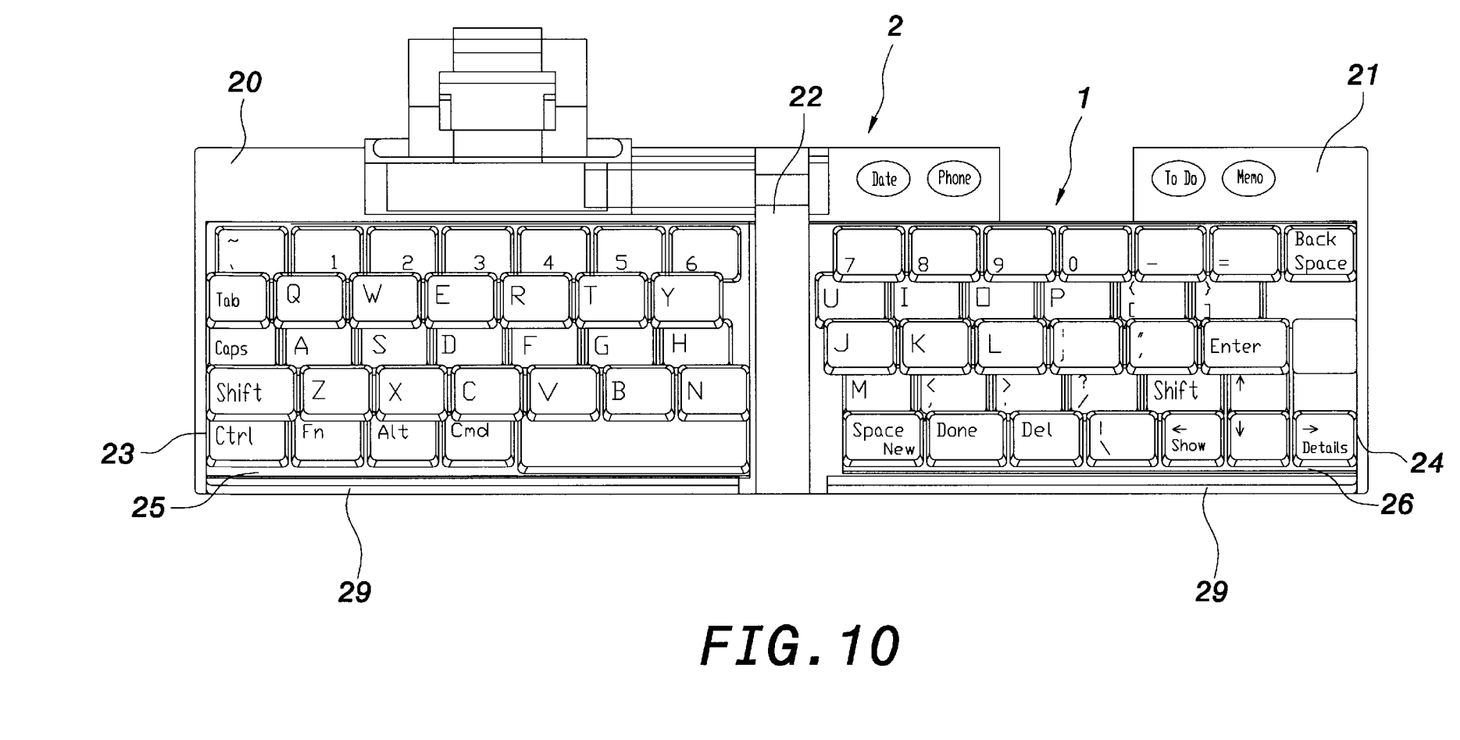
FIG. 10 is a top view showing the outer cover in a collapsed state.

Moreover, a slidable structure 17 is provided between the bases 14 of two adjacent keyswitches 10. The slidable structure 17 is composed of a sliding surface 18 and a sliding plate 19. The sliding surface 18 and the sliding plate 19 are arranged atop the bases 14. The sliding plate 19 is slidable atop the sliding surface 18 or below the sliding surface 18. As shown in FIG. 5, to collapse the keyboard, the keyswitches 10 are collapsed toward each other with the separation P being reduced. Moreover, the membrane circuit 11 is also advantageously deformed in response to the reduction in transverse or longitudinal length of the keyboard, as shown in FIG. 10. Therefore, the keyboard is collapsed to have a compact size for portability.

Figure 6:
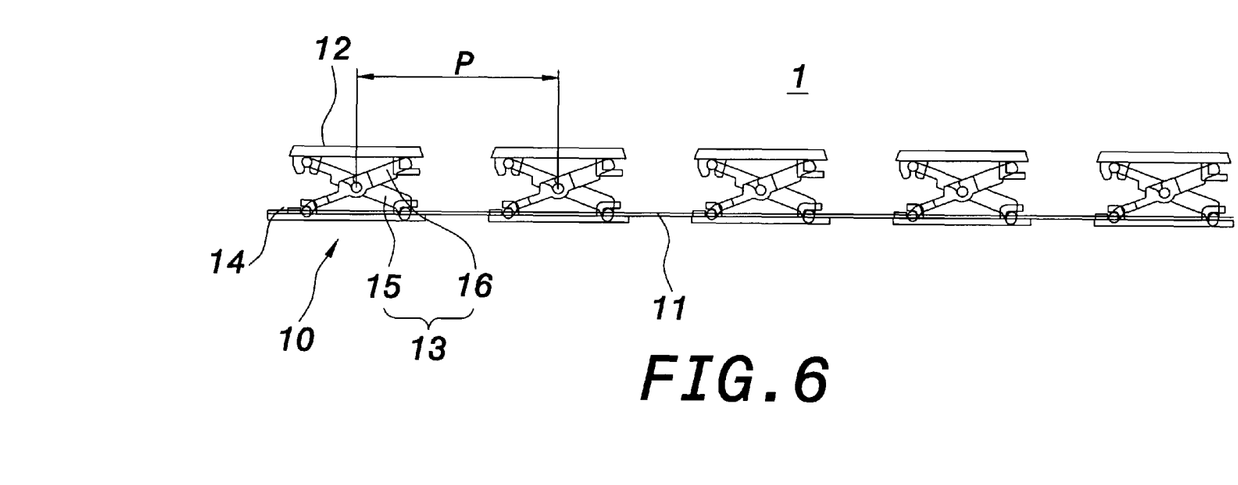
FIG. 6 shows a partial sectional view of the keyboard in an expanded state according to another preferred embodiment of the present invention.
Figure 7:
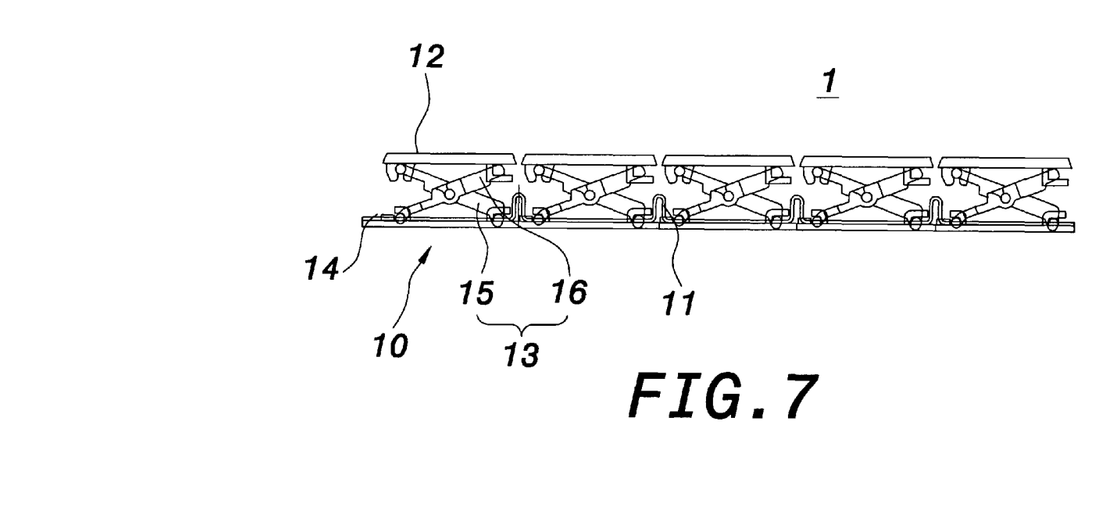
FIG. 7 shows a partial sectional view of the keyboard in a collapsed state according to another preferred embodiment of the present invention.

FIG. 6 shows a partial sectional view of the keyboard in an expanded state according to another preferred embodiment of the present invention, and FIG. 7 shows a partial sectional view of the keyboard in a collapsed state according to another preferred embodiment of the present invention. Two adjacent keyswitches 10 have a separation P similar to that in a standard keyboard. The sizes of the key cap 12 and the base 14 are reduced, while the key cap 12 still has sufficient size for smooth operation. Therefore, the user won't type an error due to a reduction in the separation R To collapse the keyboard, the membrane circuit 11 is deformed and adjacent keyswitches abut to each other. Therefore, the keyboard in this preferred embodiment does not require a slidable structure provided between the bases 14 of two adjacent keyswitches 10. The lever assembly 13 also facilitates to reduce the height of the keyboard.

Figure 8:
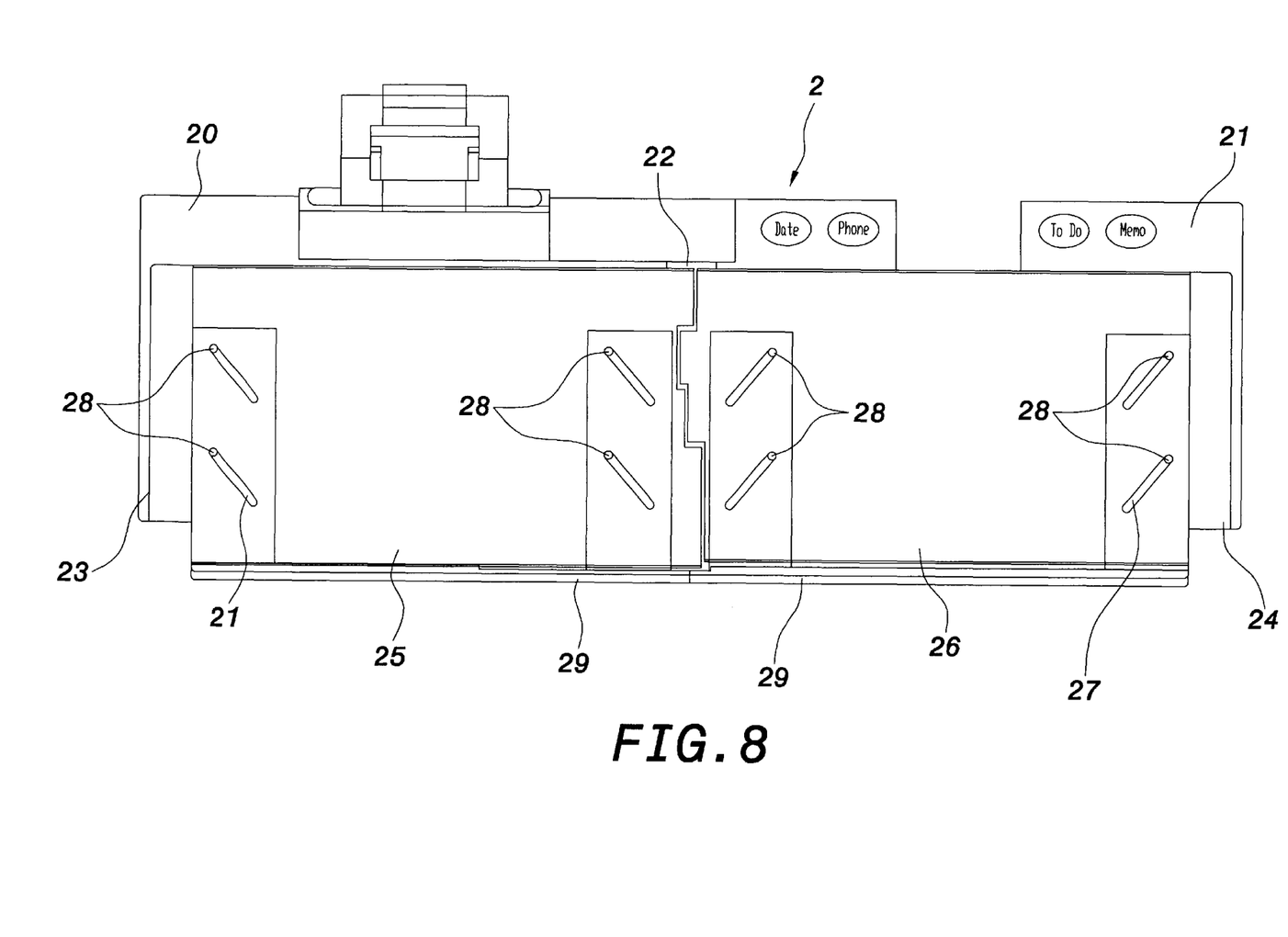
FIG. 8 is a top view showing the keyboard of the present invention with an outer cover.

As shown in FIG. 8, an outer cover 2 is provided to the keyboard of the invention. The outer cover 2 is composed of two covering plates 20 and 21 pivotally connected through a pivotal plate 22.

More particularly, one side of the pivotal plate 22 is pivotally connected to one lateral side of one of the covering plates 20, and another side of the pivotal plate is pivotally connected to one lateral side of the other covering plate 21. Therefore, the two covering plates 20 and 21 are assembled integrally through the pivotal plate 22.

The two covering plates 20 and 21 have an accommodating space 23 and 24, respectively. The accommodating spaces 23 and 24 receive two movable plates 25 and 26, respectively. Each of the two movable plates 25 and 26 has a slanting slot 27, and each of the accommodating spaces 23 and 24 has a guiding pin 28 slidably fit in the slanting slot 27. Therefore, the movable plates 25 and 26 can be moved in an up and down direction as the slanting slot 27 slides with respect to the guiding pin 28.

More particularly, each of the two movable plates 25 and 26 has a fixed side 29 on an outer lateral side thereof. The fixed side 29 is used to facilitate the movement of the movable plates 25 and 26 and the assembling of the keyboard module 1.

Figure 9:
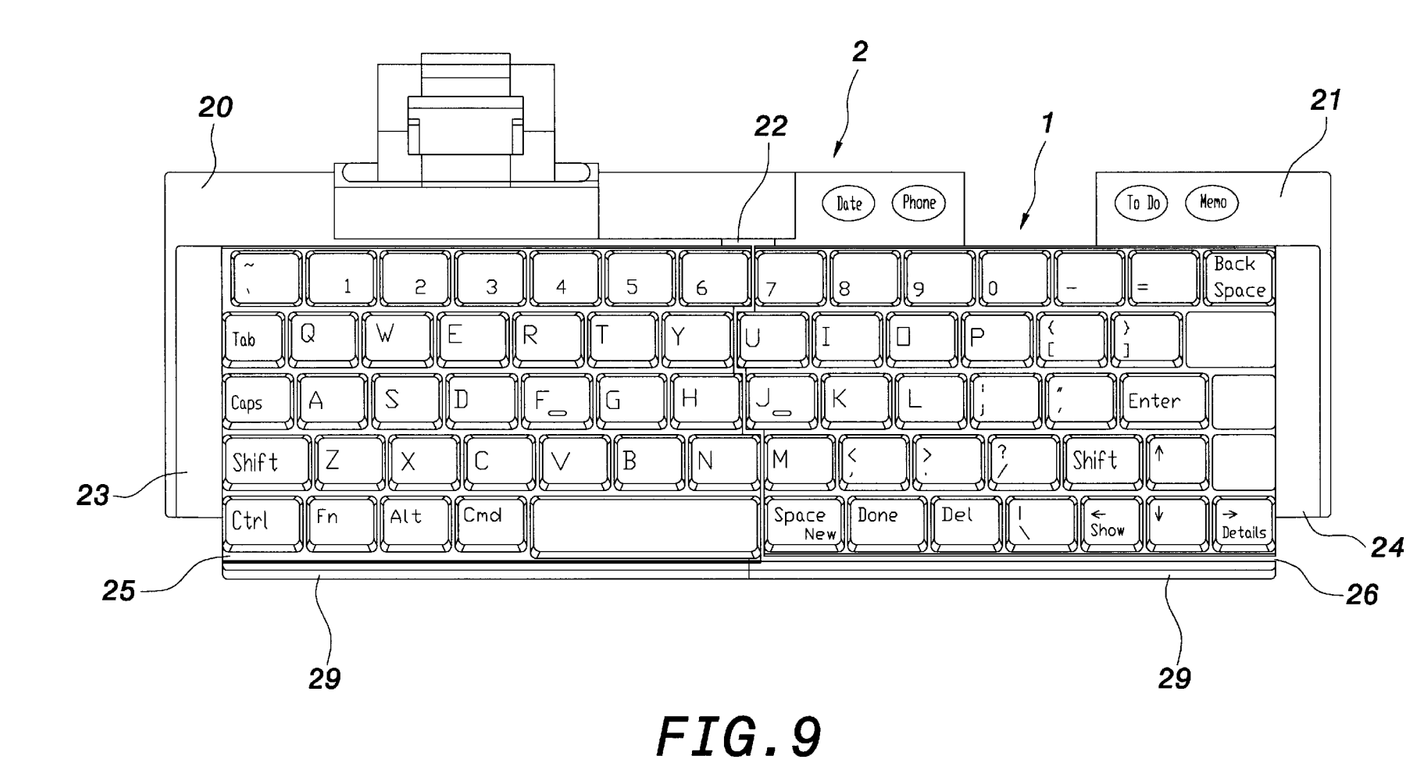
FIG. 9 is a top view showing the outer cover in an expanded state.

As shown in FIGS. 9 and 10, the keyboard modules 1 are arranged on the two movable plates 25 and 26. The fixed side 29 is operated to move the movable plates 25 and 26 upward. The keyswitches 10 of the keyboard modules 1 are collapsed and received in the accommodating spaces 23 and 24, respectively. It is easier for the user to fold the outer cover 2.

Moreover, the keyboard modules 1 are staggered to each other when the outer cover 2 is folded. Therefore, each keyswitch 10 is positioned within an indentation formed by the plurality of keyswitches 10 to reduce the resultant thickness of keyboard after the outer cover 2 is folded.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A collapsible keyboard, comprising:
    at least one keyboard module, having:
        at least a first and a second adjacent keyswitch arranged in an array pattern, the first keyswitch having a predetermined separation with the adjacent second keyswitch, each keyswitch having a base, with the base of the first keyswitch having a sliding surface thereon, and the base of the second keyswitch having a sliding plate thereon, the first keyswitch and the second keyswitch being positionable in an expanded state where the respective keyswitches have the predetermined separation and where the respective bases are located at essentially the same level, and are positionable in a collapsed state due to the sliding surface and the sliding plate interacting to cause the respective bases to be at different levels, thereby causing the first and second keyswitch to collectively take up less surface area than when in the expanded state,
        wherein each keyswitch further comprises a key cap, and a lever assembly, the lever assembly having a top portion connected to a bottom of the key cap and a bottom portion connected to a top of the base; and
    at least one membrane circuit provided to connect the first and the second keyswitches and enable the first and the second keyswitches to be arranged in the collapsed state, whereby a separation between the first and the second keyswitches is reduced and the keyboard has a reduced size.

2. The collapsible keyboard as in claim 1, wherein the lever assembly is of a scissors structure.

* * * * *